(No Model.)

J. L. SULLIVAN.
FAUCET.

No. 586,079.  Patented July 6, 1897.

Witnesses
Grant Burroughs.
Benjamin F. Evans

Inventor,
Josiah Lee Sullivan,
By his Attorneys,
Finckel & Finckel.

UNITED STATES PATENT OFFICE.

JOSIAH LEE SULLIVAN, OF COLUMBUS, OHIO, ASSIGNOR TO WILLIS I. MILLER, OF SAME PLACE.

FAUCET.

SPECIFICATION forming part of Letters Patent No. 586,079, dated July 6, 1897.

Application filed December 26, 1896. Serial No. 617,066. (No model.)

*To all whom it may concern:*

Be it known that I, JOSIAH LEE SULLIVAN, a citizen of the United States, residing at Columbus, in the county of Franklin and State of Ohio, have invented certain new and useful Improvements in Faucets; and I do hereby declare the following to be a full, clear, and exact description of the invention, such as will enable others skilled in the art to which it appertains to make and use the same.

The object of my invention is to provide a faucet of simple and economical form especially adapted for draining the tubs of washing-machines and other vessels from which wash-water or other fluid is to be drawn.

My invention is embodied in a device composed of two tubular parts, one fitting and slidable within the other, the outer part being adapted to be fitted in the tub or other vessel and the inner one having its outer end closed by a circumferentially-projecting head and having a vent in its side, and also having in its surface a spirally-inclined groove adapted to be engaged by a lug on the outer part to compress a packing between the outer end of the outer tube and the projecting flange of the head of the inner tube.

My invention also embraces other details of construction, substantially as hereinafter set forth and claimed.

Figure 1:
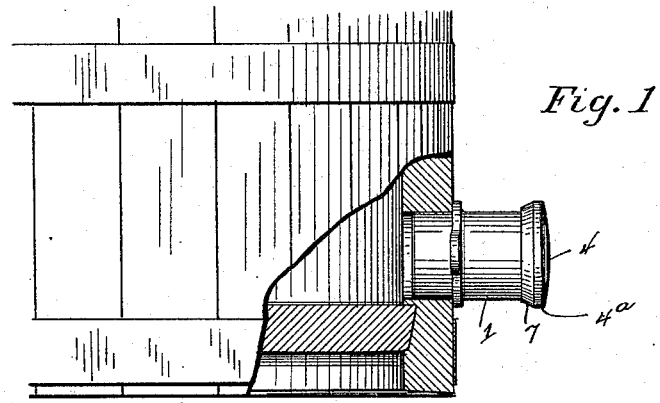
Figure 2:
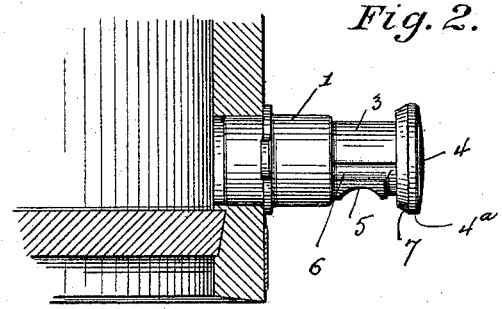
Figure 3:
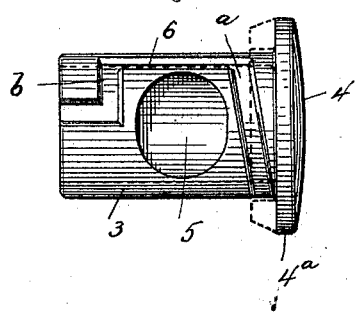
Figure 4:
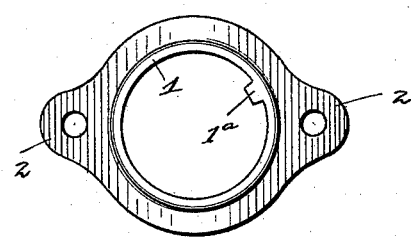

In the annexed drawings, Figure 1 is a side elevation of an embodiment of my invention, the faucet being closed. Fig. 2 is a view of it open. Fig. 3 is a side view, on a larger scale, of the inner tube removed, the position of the washer or packing being shown in dotted lines. Fig. 4 is an outer end view, on the scale of Fig. 3, of the inner tube.

Like characters of reference in the several views designate corresponding parts.

1 designates the outer tube, which is provided with an inwardly-projecting lug $1^a$. This part 1 may be furnished with perforated ears 2 to permit it to be securely fastened to the tub or other vessel.

3 designates the inner tube, which is closed at its outer end by a head 4, having a projecting flange $4^a$. This flange may have its edge roughened or scalloped, thus affording a good gripping-surface to turn the tube.

5 designates the vent or opening of the inner tube, and 6 a groove on the surface thereof of substantially  shape.

7 designates the annular washer or gasket, of leather, rubber, or other suitable material, which fits upon the tube 3 and against the projecting flange or shoulder $4^a$ of the head.

The groove 6 shown extends from the head 4 to the inner end of the tube 3, and by placing this inner tube so that the lug $1^a$ shall project into the groove the inner tube may be pushed into the outer one until the faucet-opening is closed. When the lug $1^a$ enters the inclined portion $a$ of the groove, a slight turn binds the parts together and compresses the washer 7 between the shoulders $4^a$ of the inner tube and the outer end of the outer tube and so renders the connection water and air tight. The rear wall of the part $b$ of the groove acts as a stop to prevent the undesigned withdrawal of the inner part of the faucet.

While I have stated that my faucet is especially adapted for use in connection with the tubs of washing-machines, it is obvious that it will be equally as useful in any place where water or other fluid is to be drained from or admitted to a vessel.

In describing the particular construction illustrated in the drawings I do not wish to be understood as confining myself to the exact forms shown, as they are susceptible of modification without departing from the principle of the thing.

What I claim, and desire to secure by Letters Patent, is—

1. A faucet composed of an inner tube and an outer tube, the inner tube being provided with a vent and closed at its outer end and having a circumferential shoulder, a spiral or inclined groove $a$ and a lug $1^a$ to engage said groove whereby the shoulder on the inner tube may be drawn toward the end of the outer tube to close the vent and compress a washer between said shoulder and the end of the outer tube.

2. A faucet comprising an inner tube and an outer tube, the inner tube being provided with a vent and having its outer end closed, and a circumferential shoulder 4ᵃ, a groove of substantially the form shown that is having the parts $a$ and $b$ upon the inner tube and a lug on the outer tube to enter and engage said groove in substantially the manner set forth.

In testimony whereof I affix my signature in presence of two witnesses.

JOSIAH LEE SULLIVAN.

Witnesses:
 HENRY NELSON REID,
 GEORGE M. FINCKEL.